(12) United States Patent
Zhao et al.

(10) Patent No.: US 10,796,646 B2
(45) Date of Patent: Oct. 6, 2020

(54) BACKLIGHT MODULE AND CONTROL METHOD, DISPLAY SCREEN AND WEARABLE DEVICE

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Hongyu Zhao, Beijing (CN); Ting Cui, Beijing (CN); Xiaoyan Tu, Beijing (CN); Kai Diao, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/338,712

(22) PCT Filed: Oct. 22, 2018

(86) PCT No.: PCT/CN2018/111209
§ 371 (c)(1),
(2) Date: Apr. 2, 2019

(87) PCT Pub. No.: WO2019/148897
PCT Pub. Date: Aug. 8, 2019

(65) Prior Publication Data
US 2019/0266957 A1 Aug. 29, 2019

(30) Foreign Application Priority Data
Feb. 2, 2018 (CN) .......................... 2018 1 0111114

(51) Int. Cl.
*G09G 3/34* (2006.01)
*F21V 8/00* (2006.01)

(52) U.S. Cl.
CPC ......... *G09G 3/3406* (2013.01); *G02B 6/0055* (2013.01); *G02B 6/0086* (2013.01); *G09G 2320/066* (2013.01)

(58) Field of Classification Search
None
See application file for complete search history.

(56) References Cited

U.S. PATENT DOCUMENTS 9,661,721 B2  5/2017  Kurita
10,408,390 B2 * 9/2019 Minor ...................... F21K 9/60
(Continued)

FOREIGN PATENT DOCUMENTS

CN  101004518 A  7/2007
CN  102708812 A  10/2012
(Continued)

OTHER PUBLICATIONS

First Office Action for Chinese Patent Application No. 201810111114.1 dated Dec. 2, 2019.
(Continued)

*Primary Examiner* — Patrick N Edouard
*Assistant Examiner* — Peijie Shen
(74) *Attorney, Agent, or Firm* — Calfee, Halter & Griswold LLP

(57) ABSTRACT

A backlight module comprising a light source and a light guide plate. The light guide plate comprises a transparent substrate and a plurality of dimming units having a reflecting function. The light source is disposed on at least one side of said transparent substrate, and the plurality of dimming units is disposed on a lower surface of the transparent substrate for adjusting an emergent intensity of light, which is incident
(Continued)

from the light source into the light guide plate, on an upper surface of said transparent substrate facing away from said dimming units. A method for controlling a backlight module and a display screen and wear device including the backlight module are also disclosed.

17 Claims, 5 Drawing Sheets

(56) References Cited

U.S. PATENT DOCUMENTS

| | | | | |
|---|---|---|---|---|
| 2004/0095558 | A1* | 5/2004 | Whitehead | H04N 9/3126 353/30 |
| 2006/0114545 | A1 | 6/2006 | Bozler et al. | |
| 2007/0172171 | A1* | 7/2007 | Van Ostrand | G02B 6/00 385/31 |
| 2009/0096967 | A1* | 4/2009 | Sung | G02F 1/133555 349/114 |
| 2010/0214208 | A1* | 8/2010 | Itoh | G02B 6/0001 345/102 |
| 2014/0240207 | A1* | 8/2014 | Yang | G02B 6/0036 345/82 |
| 2014/0362604 | A1* | 12/2014 | Masuda | G02B 6/0038 362/619 |
| 2015/0185397 | A1* | 7/2015 | Klement | G02B 6/005 345/690 |
| 2016/0295178 | A1* | 10/2016 | Damberg | H04N 9/3152 |
| 2019/0094611 | A1* | 3/2019 | You | G02F 1/1343 |

FOREIGN PATENT DOCUMENTS

| | | | |
|---|---|---|---|
| CN | 104501034 | A | 4/2015 |
| CN | 106291800 | A | 1/2017 |
| CN | 106405880 | A | 2/2017 |
| CN | 107315283 | * | 11/2017 |
| CN | 107315283 | A | 11/2017 |
| CN | 206684435 | U | 11/2017 |
| CN | 107589594 | A | 1/2018 |
| CN | 107643622 | A | 1/2018 |
| JP | 2007034120 | A | 2/2007 |

OTHER PUBLICATIONS

Search Report and Written Opinion for International Application No. PCT/CN2018/111209 dated Jan. 31, 2019.

* cited by examiner

BACKLIGHT MODULE AND CONTROL METHOD, DISPLAY SCREEN AND WEARABLE DEVICE

RELATED APPLICATIONS

The present application is the U.S. national phase entry of PCT/CN2018/111209, with an international filing date of Oct. 22, 2018, which claims the benefit of Chinese Patent Application for invention No. 201810111114.1, filed on Feb. 2, 2018, the entire disclosure of which is incorporated herein by reference.

TECHNICAL FIELD

The present disclosure relates to the technical field of displays, in particular to a backlight module and control method, a display screen and a wearable device.

BACKGROUND

Virtual Reality (VR) technology is a type of computer simulating system that can create and experience a virtual world. As a type of system simulation of a multi-source information integrated interactive three-dimensional dynamic visual and entity behaviors, it generates a simulated environment by using a computer and enables a user to be immersed in the simulated environment.

In related technology, VR glasses are a type of wearable display device that applies the VR technology to a display device to enable a user to be immersed in the environment. When a display device in VR glasses is a liquid crystal display device, the partition dimming performance of a backlight module is poor due to the small volume of the VR glasses. As a result, the light and shade contrast of images displayed by the VR glasses is not good enough to discriminate detailed differences of images.

SUMMARY

According to an exemplary embodiment, a backlight module is provided, comprising a light source and a light guide plate, said light guide plate comprises a transparent substrate and a plurality of dimming units having reflecting function, said light source is disposed on at least one side of said transparent substrate, and said plurality of dimming units is disposed on the lower surface of the transparent substrate and adjusts intensity of the light incident from said light source into said light guide plate and emergent from the upper surface of said transparent substrate facing away from said dimming units.

In an exemplary embodiment, the dimming units are distributed in a matrix on said transparent substrate.

In an exemplary embodiment, at least one of the dimming units comprises a squeezing unit and at least one elastic reflecting element located between said squeezing unit and a surface of said transparent substrate; said squeezing unit is configured to provide a pressure towards said elastic reflecting element, said elastic reflecting element is configured to produce an elastic deformation when the pressure is provided by said squeezing unit and change a contact area with said transparent substrate.

In an exemplary embodiment, said elastic reflecting element is an elastic sphere having a reflective surface, and two adjacent elastic reflecting elements have a space therebetween.

In an exemplary embodiment, said squeezing unit comprises a squeezing plate in contact with said at least one elastic reflecting element and an electrically driven pressure head connected to said squeezing plate, said electrically driven pressure head is used to drive said squeezing plate to squeeze said elastic reflecting element.

In an exemplary embodiment, said backlight module further comprises a pressure control unit connected to each of the electrically driven pressure heads; said pressure control unit is configured to control a pressure of each of the electrically driven pressure heads based on dimming requirement.

In an exemplary embodiment, said pressure control unit comprises: a receiving unit connected to a grey scale correction unit and configured to receive a grey scale display voltage; a voltage setting unit configured to set a control voltage parameter for each electrically driven pressure head according to said grey scale display voltage; a pressure setting unit configured to set a pressure for each electrically driven pressure head according to the control voltage parameter for each electrically driven pressure head and to set a driving voltage for each electrically driven pressure head according to the pressure of each electrically driven pressure head.

In an exemplary embodiment, said pressure setting unit comprises: a storage module configured to store an initial pressure of each electrically driven pressure head; an initial pressure of each electrically driven pressure head makes brightness of light incident into the transparent substrate homogeneous after being reflected by the elastic reflecting elements; a pressure calculating module configured to obtain a relative pressure of each electrically driven pressure head according to a control voltage parameter of each electrically driven pressure head and to obtain a pressure of each electrically driven pressure head according to an initial pressure of each electrically driven pressure head and a relative pressure of the corresponding electrically driven pressure head.

In an exemplary embodiment, said backlight module further comprises an elastic buffering plate disposed on a side of said squeezing plate in proximity to said elastic reflecting element, a projection area of said elastic buffering plate on said transparent substrate covers a projection area of a squeezing face of said squeezing plate on said transparent substrate, said elastic buffering plate has a reflecting function.

According to another exemplary embodiment, a display screen is provided, comprising the aforesaid backlight module and a display panel for use in collaboration with said backlight module, said display panel is disposed on a light exiting face of said backlight module.

In an exemplary embodiment, each dimming unit is used to adjust brightness of at least one pixel of said display panel for use in collaboration with said backlight module.

In an exemplary embodiment, each dimming unit comprises a squeezing unit and at least one elastic reflecting element located between said squeezing unit and a surface of said transparent substrate; said squeezing unit applies a pressure towards said elastic reflecting element, said elastic reflecting element has an elastic deformation when a pressure is applied by said squeezing unit and changes a contact area with said transparent substrate.

In an exemplary embodiment, a coverage area of each elastic reflecting element on said transparent substrate is in a range of a total area of 150 pixels of the display panel.

According to another exemplary embodiment, a wearable device comprising said display screen is provided.

According to another exemplary embodiment, a method for controlling a backlight module is provided, said method is used to control said backlight module. Said method for controlling a backlight module comprises: receiving a grey scale display voltage; setting a control voltage parameter for each electrically driven pressure head according to said grey scale display voltage; setting a pressure for each electrically driven pressure head according to the control voltage parameter for each electrically driven pressure head and setting a driving voltage for each electrically driven pressure head according to the pressure of each electrically driven pressure head.

In an exemplary embodiment, before receiving a grey scale display voltage, said method for controlling a backlight module further comprises: storing an initial pressure of each electrically driven pressure head; the initial pressure of each electrically driven pressure head controls brightness of light incident into the transparent substrate to be homogeneous after being reflected by the elastic reflecting elements; setting a pressure for each electrically driven pressure head according to the control voltage parameter for each electrically driven pressure head comprises: obtaining a relative pressure of each electrically driven pressure head according to a control voltage parameter of each electrically driven pressure head and obtaining a pressure of each electrically driven pressure head according to an initial pressure of each electrically driven pressure head and a relative pressure of the corresponding electrically driven pressure head.

BRIEF DESCRIPTION OF THE FIGURES

The figures described herein are provided for further understanding of the present disclosure and constitute a part of the present disclosure. The illustrative embodiments and description thereof in the present disclosure are used to explain the present disclosure but do not constitute unsuitable limitation of the present disclosure. In the drawings.

DETAILED DESCRIPTION OF EMBODIMENTS

Figure 1:
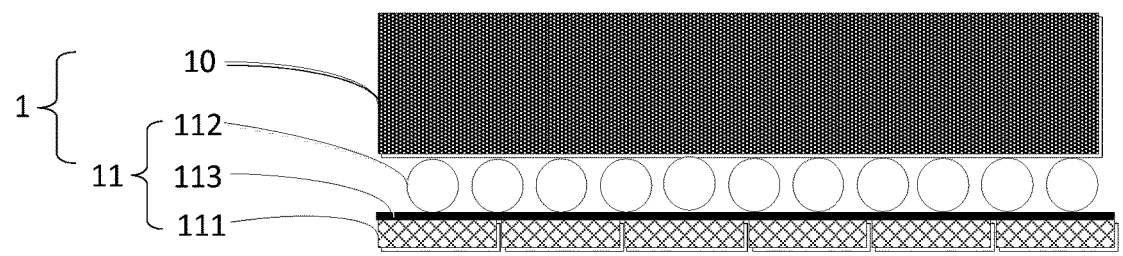
FIG. 1 is a side view of a backlight module provided in an exemplary embodiment.

Exemplary embodiments will be described in detail. Examples of the embodiments will be shown in the drawings, where same or similar reference signs indicate same or similar elements or elements having same or similar functions throughout the description. The embodiments described below with reference to the drawings are exemplary, and they are only intended to explain the disclosure, instead of limiting the protection scope of the application.

In related technology, due to the small size of a wearable display device, a backlight module of a wearable display device is incapable of performing precise partition dimming, thus, the light and shade contrast of images displayed by the wearable display device is not good enough to discriminate detailed differences of images.

The objective of the present disclosure is to provide a backlight module and control method, a display screen and a wear device to enhance the partition dimming performance of a backlight module and improve the light and shade contrast of images displayed by the display device so as to discriminate detailed differences of images.

As shown in FIGS. 1-4, a backlight module comprises a light guide plate 1 and a light source 2. Said light guide plate 1 comprises a transparent substrate 10 and a plurality of dimming units 11. The light source 2 is disposed on at least one side of said transparent substrate 10. The plurality of dimming units 11 is disposed on the lower surface of the transparent substrate 10. Each dimming unit 11 is used to adjust an emergent intensity of the light, which is incident from said light source 2 into said light guide plate, on the upper surface of said transparent substrate facing away from said dimming units 11.

As compared with related technology, in the backlight module provided in the present disclosure, the light source is disposed on a side of the transparent substrate and a plurality of dimming units is disposed on the lower surface of the transparent substrate. Since each dimming unit is used to adjust an emergent intensity of the light, which is incident from said light source into said light guide plate, on the upper surface of said transparent substrate facing away from said dimming units, it enables the backlight module, when applied to a wear device, to set the number of dimming units according to a dimming partition requirement of the wear device such that partition adjustment of emergent light from the transparent substrate can be implemented by adjusting light incident into the transparent substrate using the respective dimming units according to the image demand when displaying an image, thereby enhancing the dimming performance of the backlight module, improving the light and shade contrast of the image displayed by the display device. As a result, detailed differences of images can be easily discriminated and the problem of dimming performance decline of a backlight module caused by a small amount of dimming partitions can be avoided.

A backlight module provided in an exemplary embodiment can be applied to display devices of conventional sizes in related arts, and to small-sized wearable devices. For instance, when a backlight module provided in an exemplary embodiment is applied to a wearable device, the number of dimming units 11 can be set according to the number of dimming partitions 100 of the wearable device, such that light incident into the transparent substrate 10 can be adjusted by using the respective dimming units 11 according to the image demand when displaying an image, and partition adjustment of emergent light from the transparent substrate 10 can be implemented, thereby enhancing the dimming performance of the backlight module. In this way, a good light and shade contrast of the images displayed by the wearable device can be obtained and detailed differences of images can be easily discriminated. As a result, the problem of dimming performance decline of a backlight module caused by a small amount of dimming partitions 100 can be avoided.

Figure 2:
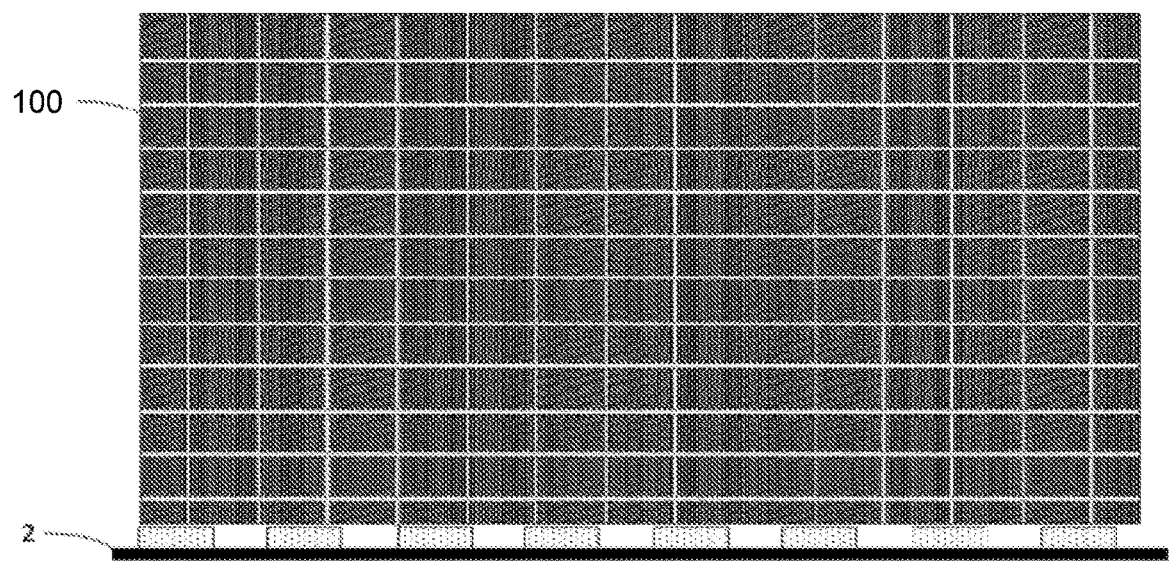
FIG. 2 is a top view of a backlight module provided in an exemplary embodiment.

It should be understood that in a backlight module provided in an embodiment of the present disclosure, the light guide plate 1 is equivalent to a light guide sheet in related technology. A face of the transparent substrate 10 in the light guide plate 1 is disposed with a plurality of dimming units 11 thereon and the other face acts as a light exiting face. As shown in FIGS. 1 and 2, when the light guide plate 1 is applied to a backlight module, a light source should be provided on a side of the light guide plate 1, and the light source can be disposed on at least one side of the transparent substrate 10 in the light guide plate 1. Of course, the four sides of the transparent substrate 10 can be provided with a light source simultaneously. The type of light source can be selected in accordance with the actual condition and conventionally a light bar 2 can be selected as a light source.

Specifically, in a backlight module provided in an exemplary embodiment, a dimming unit 11 can be implemented in various structures. A detailed description is given hereinafter in combination with FIGS. 1-4. Referring to FIGS. 1-4, each dimming unit 11 comprises a squeezing unit 111 and at least one elastic reflecting element 112 formed on a surface of a transparent substrate 10; the elastic reflecting element 112 is located between the squeezing unit 111 and the surface of a transparent substrate 10. The squeezing unit 111 applies a pressure towards said elastic reflecting element 112, and said elastic reflecting element 112 has an elastic deformation when the pressure is applied by said squeezing unit 111 and changes a contact area with said transparent substrate.

The higher of the squeezing degree of the elastic reflecting element 112, the larger a contact area between the elastic reflecting element 112 and the surface of a transparent substrate 10, and the higher the brightness of emergent light from reflection of the light incident into the transparent substrate 10 by the elastic reflecting element 112; the lower of the squeezing degree of the elastic reflecting element 112, the smaller a contact area between the elastic reflecting element 112 and the surface of a transparent substrate 10, and the lower the brightness of emergent light from reflection of the light incident into the transparent substrate 10 by the elastic reflecting element 112. Said squeezing degree represents a deformation degree of the elastic reflecting element after being squeezed.

Figure 5:
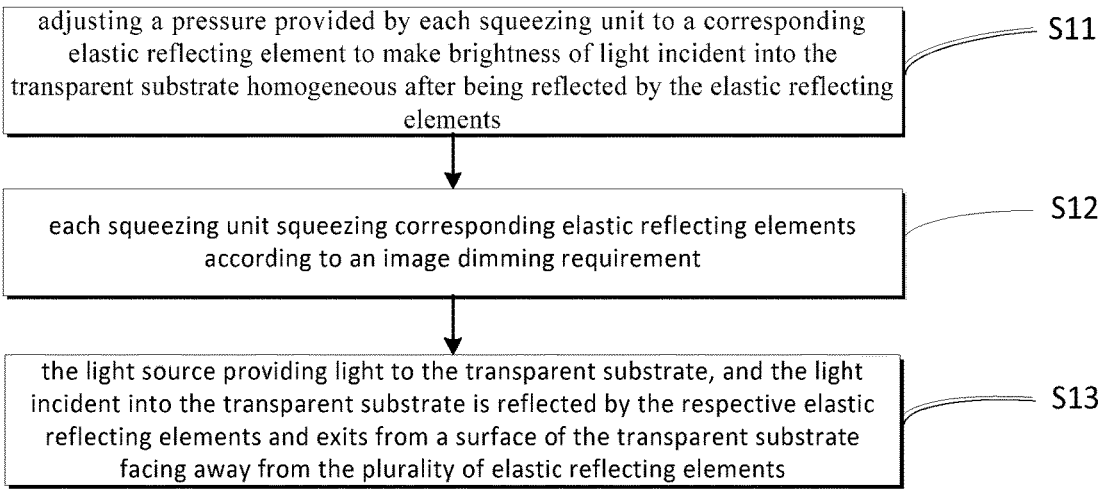
FIG. 5 is a flow chart of a method for controlling a backlight module provided in an exemplary embodiment.

In combination with FIG. 1 and FIG. 5, the following steps explain how a backlight module provided in an exemplary embodiment implements a dimming function of a dimming unit:

Step S11: When all elastic reflecting elements 112 are in a non-squeezing state, brightness of light from reflection of the light incident into the transparent substrate 10 by the elastic reflecting elements 112 is inhomogeneous, which results in complexity of adjustment of light brightness. Thus, a pressure applied by each squeezing unit 111 to corresponding elastic reflecting elements 112 needs to be adjusted such that the brightness of light from reflection of the light incident into the transparent substrate 10 by the respective elastic reflecting elements 112 is homogeneous (a homogeneous brightness is called a standard brightness). A squeezing degree of the elastic reflecting elements 112 at this time is used as a reference squeezing degree of the elastic reflecting elements 112, in this way, a correspondence relationship between a reference squeezing degree and brightness of reflected light is established. When each of the squeezing units 111 needs to squeeze corresponding elastic reflecting elements 112 in accordance with an image dimming requirement, it only needs to determine a squeezing degree desired by each elastic reflecting element 112 according to a difference between a dimming brightness and the standard brightness.

Figure 6:
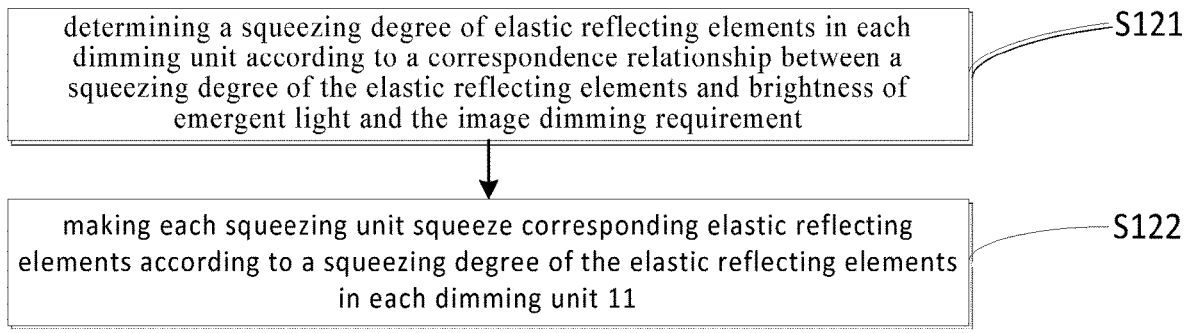
FIG. 6 is a flow chart of each squeezing unit squeezing corresponding elastic reflecting elements according to an image dimming demand according to an exemplary embodiment.

Step S12: Each squeezing unit 111 squeezes corresponding elastic reflecting elements 112 in accordance with an image dimming requirement. Illustratively, as shown in FIGS. 1 and 6, based on a correspondence relationship between a squeezing degree of the elastic reflecting elements 112 and the brightness of emergent light, each squeezing unit 111 squeezing corresponding elastic reflecting elements 112 in accordance with an image dimming requirement comprises:

Step S121: determining a squeezing degree of the elastic reflecting element 112 in each dimming unit 11 according to a correspondence relationship between a squeezing degree of the elastic reflecting element 112 and the brightness of emergent light and an image dimming requirement;

Step S122: making each squeezing unit 111 squeeze corresponding elastic reflecting elements 112 according to a squeezing degree of the elastic reflecting elements 112 in each dimming unit 11.

Step S13: the light source provides light to the transparent substrate 10, and light incident into the transparent substrate 10 is reflected by the respective elastic reflecting elements 112 and exits from a surface of the transparent substrate 10 facing away from the plurality of elastic reflecting elements 112.

Specifically, as shown in FIGS. 1-4, viewing from a side of the transparent substrate 10, there are 6 squeezing units 111 and 22 elastic reflecting elements 112. The 6 squeezing units 111 are a first squeezing unit 1111, a second squeezing unit 1112, a third squeezing unit 1113, a fourth squeezing unit 1114, a fifth squeezing unit 1115 and a sixth squeezing unit 1116. The 22 elastic reflecting elements 112 are divided into 6 groups, including a first group of elastic reflecting elements (3 elastic reflecting elements), a second group of elastic reflecting elements (4 elastic reflecting elements), a third group of elastic reflecting elements (4 elastic reflecting elements), a fourth group of elastic reflecting elements (4 elastic reflecting elements), a fifth group of elastic reflecting elements (4 elastic reflecting elements) and a sixth group of elastic reflecting elements (3 elastic reflecting elements).

The first squeezing unit 1111 is used to squeeze the first group of elastic reflecting elements, the second squeezing unit 1112 is used to squeeze the second group of elastic reflecting elements, the third squeezing unit 1113 is used to squeeze the third group of elastic reflecting elements, the fourth squeezing unit 1114 is used to squeeze the fourth group of elastic reflecting elements, the fifth squeezing unit 1115 is used to squeeze the fifth group of elastic reflecting elements, and the sixth squeezing unit 1116 is used to squeeze the sixth group of elastic reflecting elements.

Figure 4:
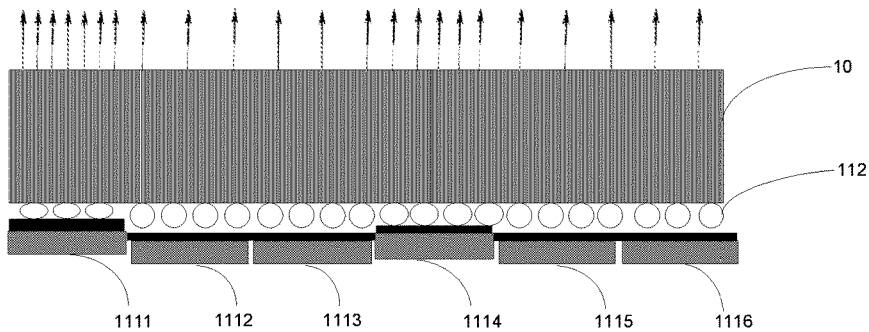
FIG. 4 is a side view of a backlight module in a partition dimming state provided in an exemplary embodiment.

From FIG. 4 it can be seen that the pressure applied by the first squeezing unit 1111 to the first group of elastic reflecting elements is the greatest, embodied as the first group of elastic reflecting elements being flattened, the pressure applied by the fourth squeezing unit 1114 to the fourth group of elastic reflecting elements is the second greatest, embodied as the fourth group of elastic reflecting elements being flattened by a lower degree than the first group of elastic reflecting elements being flattened; and the second squeezing unit 1112, the third squeezing unit 1113, the fifth squeezing unit 1115 and the sixth squeezing unit 1116 do not squeeze the corresponding second group of elastic reflecting elements, third group of elastic reflecting elements, fifth group of elastic reflecting elements, and sixth group of elastic reflecting elements.

In the sense of partition dimming, after the light adjustment, light intensity at a position of the transparent substrate 10 corresponding to the first group of elastic reflecting elements is the largest, that is, the light brightness is the highest; light intensity at a position of the transparent substrate 10 corresponding to the fourth group of elastic reflecting elements is the second largest, that is, the light brightness is the second highest; and the positions of the transparent substrate 10 corresponding to the other groups of elastic reflecting elements are the smallest, that is, light brightness is the lowest.

Based on the specific implementing process of a backlight module provided in an exemplary embodiment it can be known that, an elastic reflecting element 112 is located between the squeezing surface of the corresponding squeezing unit 111 and the surface of a transparent substrate 10, such that light incident into the transparent substrate 10 can be reflected by the elastic reflecting element 112 and exits from a surface of the transparent substrate 10 facing away from the plurality of elastic reflecting elements 112. Thus, the function of the plurality of elastic reflecting elements 112 is the same as the internal dots of a light guide plate. Each squeezing unit 111 and corresponding elastic reflecting elements 112 together form a dimming unit 11, each dimming unit 11 is used to adjust brightness of at least one pixel. The higher the squeezing degree of the elastic reflecting elements 112s, the higher the brightness of emergent light from reflection of the light incident into the transparent substrate 10 by the elastic reflecting elements 112; the lower of the squeezing degree of the elastic reflecting elements 112, the lower the brightness of emergent light from reflection of the light incident into the transparent substrate 10 by the elastic reflecting elements 112. Thus, when dimming of an image is required, a size of a squeezing surface of each squeezing unit 111 and the corresponding elastic reflecting elements 112 can be set in accordance with the image dimming requirement to match the number and positions of dimming units 11 with the number and positions of dimming partitions 100. In this way, the dimming performance of the backlight module can be enhanced, and a good light and shade contrast of the image displayed by the display device can be obtained so that detailed differences of images can be easily discriminated, thereby avoiding the problem of dimming performance decline of a backlight module caused by a small amount of dimming partitions 100.

Furthermore, in a backlight module provided in an embodiment of the present disclosure, each of the squeezing units 111 can adjust a squeezing degree of corresponding elastic reflecting elements 112 independently, which enables each dimming unit 11 to adjust brightness of a corresponding pixel dynamically, thereby achieving the objective of dynamic dimming.

It should be noted that in a non-squeezing state, a coverage area of each elastic reflecting element 112 on said transparent substrate 10 does not exceed a total area of 150 pixels of the display panel used in collaboration with the backlight module. In this state, there may be more elastic reflecting elements 112 on the surface of the transparent substrate 10 opposite to the squeezing units 111, such that more dimming partitions 100 can be formed when the number of elastic reflecting elements 112 corresponding to a squeezing unit 111 is fixed, thereby enhancing the dimming performance of the backlight module. The number of elastic reflecting elements 112 can be set in accordance with the dimming requirement. Preferably, it is ensured there is a distance between any two adjacent elastic reflecting elements 112 so that any two adjacent elastic reflecting elements 112 just do not come into contact in a maximal squeezing state. In this way, the number of elastic reflecting elements 112 can be maximized and partition dimming can be better implemented. Considering that the force of friction between the elastic reflecting elements 112 and the transparent substrate 10 is not great, there might be the problem of displacement of an elastic reflecting element 112 when a squeezing unit 111 squeezes the elastic reflecting element 112, consequently, the squeezing degree of the elastic reflecting element 112 may not be adjusted in accordance with the actual demand although the squeezing unit 111 squeezes the elastic reflecting element 112. Thus, a plurality of elastic reflecting elements 112 can be disposed fixedly on the surface of the transparent substrate 10, and the specific manner can be bonding or other adhesive manners to ensure the positions of the elastic reflecting elements 112 fixed on the surface of the transparent substrate 10, thereby preventing the problem of displacement of an elastic reflecting element 112 when a squeezing unit 111 squeezes the elastic reflecting element 112. The shape of a squeezing surface of the squeezing unit 111 can be rectangular, round or hexagonal.

Considering the squeezing unit 111 squeezing the elastic reflecting element 112 towards the transparent substrate 10, usually a rigid transparent substrate is selected, and a common rigid transparent substrate includes a polymethyl methacrylate (abbreviated as PMMA) substrate or a common inorganic glass substrate.

Furthermore, a plurality of elastic reflecting elements 112 can be arranged on the surface of the transparent substrate 10 uniformly. Considering that the elastic reflecting elements 112 are flattened on the surface of the transparent substrate 10 under the squeezing of the squeezing unit 111, a surface of elastic reflecting element 112 is usually of a curved plane structure in order to avoid abrasion of the transparent substrate 10 when the elastic reflecting elements 112 are squeezed. Specifically, an elastic sphere having a reflective surface can be selected, such as an elastic ellipsoid having a reflective surface or an elastic globe having a reflective surface. The elastic reflecting element 112 made of an elastic material having a reflecting property, such as an elastic reflecting element made of rubber, or an elastic reflecting element made of other elastic polymers. The color of the elastic reflecting element 112 is usually selected as white so that the light reflected from the elastic reflecting element 112 will not present different colors and the purity of color of the light is ensured. The plurality of elastic reflecting elements 112 may have a uniform size or different sizes. However, taking the convenience of manufacturing of the elastic reflecting elements 112 and the controllability of partition dimming into account, the sizes of the plurality of elastic reflecting elements 112 are preferably the same.

It should be understood that, as shown in FIGS. 1 and 4, since the surface of the elastic reflecting elements 112 is usually of an curved plane structure, an area of orthographic projection of the elastic reflecting element 112 on the transparent substrate 10 is different in different squeezing states, that is, the greater the pressure applied by the squeezing unit 111 on the corresponding elastic reflecting elements 112, the larger the area of orthographic projection of the elastic reflecting elements 112 on the transparent substrate 10, and the larger the area of contact between the elastic reflecting elements 112 and the transparent substrate 10. The surface of the elastic reflecting element 112 can be of a smooth structure or a coarse structure. When the surface of the elastic reflecting element 112 is a coarse structure, when light is reflected by the surface of the elastic reflecting element in contact with the transparent substrate, light is reflected in various directions by the coarse surface of the elastic reflecting element in contact with the transparent substrate and exits from the surface of said transparent substrate facing away from the elastic reflecting element in the form of scattering, thereby the elastic reflecting element implements a scattering function of dots on light and homogeneity of emergent light can be enhanced.

Any two adjacent elastic reflecting elements 112 may have a problem of interference under the maximal squeezing state, which results in displacement of the elastic reflecting element 112 being interfered. Thus, any two adjacent elastic reflecting elements 112 should have a gap under the maximal squeezing state to ensure that interference will not occur when any two adjacent elastic reflecting elements 112 are both under the maximal squeezing state and the elastic reflecting elements 112 come into contact with the transparent substrate 10 to the maximal extent under the maximal squeezing state.

Based on the correspondence relationship between the squeezing degree of elastic reflecting elements 112 and brightness of emergent light, the elastic reflecting elements 112 coining into contact with the transparent substrate 10 to the maximal extent under a maximal squeezing state can ensure maximization of an adjusting range of light intensity by the elastic reflecting elements 112.

However, a gap between any two adjacent elastic reflecting elements 112 under a maximal squeezing state cannot be big without a limit. Usually, the gap should make an orthographic projection of the gap on the transparent substrate 10 smaller than an orthographic projection of the elastic reflecting element 112 on the transparent substrate 10. Optimally, a gap that keeps any two adjacent elastic reflecting elements 112 just not coining into contact under a maximal squeezing state is the best.

Figure 3:
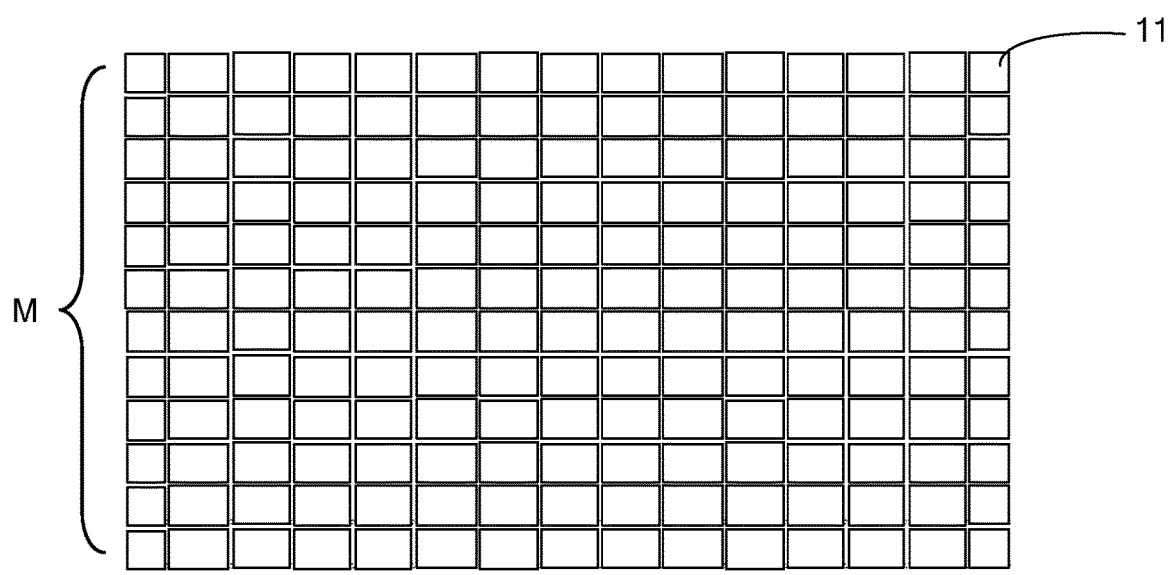
FIG. 3 is an illustrative diagram of the structure of a matrix squeezing unit in an exemplary embodiment.

As shown in FIG. 2 and FIG. 3, the dimming units 11 in an embodiment of the present disclosure can be arranged freely or arranged in a matrix as shown in FIG. 2, such that each said dimming unit is used to adjust brightness of at least one pixel of said display panel for use in collaboration with said backlight module. When the dimming units 11 are arranged in a matrix as shown in FIG. 2, the squeezing units 111 in the embodiment of the present disclosure are in the arrangement of a matrix, such that light passing through the transparent substrate 10 presents dimming partitions 100 having a number and position corresponding to a number and position of the squeezing units 111, and the dimming partitions 100 are in an arrangement of a matrix to enable more even dimming.

FIG. 2 illustrates dimming units 11 of 12 rows×15 columns, correspondingly, as shown in FIG. 3, the number of dimming units 11 in an embodiment of the present disclosure is 12×15=180, and 180 dimming units 11 form a matrix dimming device M, wherein the 180 dimming units 11 in the matrix dimming device M are arranged in the form of 12 rows×15 columns and corresponding to the positions of the dimming partitions 100.

Furthermore, as shown in FIG. 1 and FIG. 4, a pressure applied by a squeezing unit 111 to an elastic reflecting element 112 can be controlled through voltage. A squeezing unit 111 may comprise a squeezing plate in contact with the elastic reflecting element 112 and an electrically driven pressure head (not shown) connected to said squeezing plate. The electrically driven pressure head is used to drive said squeezing plate to squeeze said elastic reflecting element 112, the electrically driven pressure head can drive the elastic reflecting element 112 based on the voltage. As shown FIG. 1, FIG. 7 and FIG. 9, a backlight module provided in an exemplary embodiment further comprises a pressure control unit 3 connected to the electrically driven pressure heads; wherein said pressure control unit 3 is configured to control a pressure of each electrically driven pressure head based on a dimming requirement of an image. A light source 2 provides light to the transparent substrate 10, light incident into the transparent substrate 10 is reflected by the elastic reflecting elements 112 and exits from surface of said transparent substrate facing away from said plurality of elastic reflecting elements 112. The pressure control unit 3 specifically comprises:

a receiving unit 31 connected to a grey scale correction unit 5 and configured to receive a grey scale display voltage;

a voltage setting unit 32 connected to said receiving unit 31 and configured to set a control voltage parameter for each electrically driven pressure head according to said grey scale display voltage;

a pressure setting unit 33 connected to the voltage setting unit 32 and the electrically driven pressure heads and configured to set a pressure for each electrically driven pressure head according to the control voltage parameter of each electrically driven pressure head and to set a driving voltage for each electrically driven pressure head according to the pressure of each electrically driven pressure head, so that each electrically driven pressure head squeezes a corresponding squeezing plate which in turn squeezes an elastic reflecting element 112 to adjust a squeezing degree of the elastic reflecting element 112, thereby implementing precise partition dimming. For example, a squeezing unit 111 comprises a first squeezing unit 1111, a second squeezing unit 1112 . . . , an ith squeezing unit 111$i$, the pressure setting unit 33 should be connected to the electrically driven pressure head included by the first squeezing unit 1111, the electrically driven pressure head included by the second squeezing unit 1112, . . . and electrically driven pressure head included by the ith squeezing unit 111$i$.

There is a correspondence relationship between a grey scale voltage included by a grey scale display voltage and a pixel brightness. Each squeezing unit 111 and corresponding elastic reflecting elements 112 together form a dimming unit 11, each dimming unit 11 is used to adjust brightness of at least one pixel. Therefore, by using a voltage setting unit 32 to set a control voltage parameter for each electrically driven pressure head according to a grey scale display voltage, the pressure setting unit 33 can control a pressure applied to corresponding elastic reflecting elements 112 according to the control voltage parameter of each electrically driven pressure head. In this way, a dimming unit 11 formed by the elastic reflecting elements 112 corresponding to each electrically driven pressure head can be controlled to adjust pixel brightness to ensure the electrically driven pressure heads can squeeze corresponding elastic reflecting elements 112 accurately, thereby implementing precise partition dimming of the backlight module.

Figure 7:
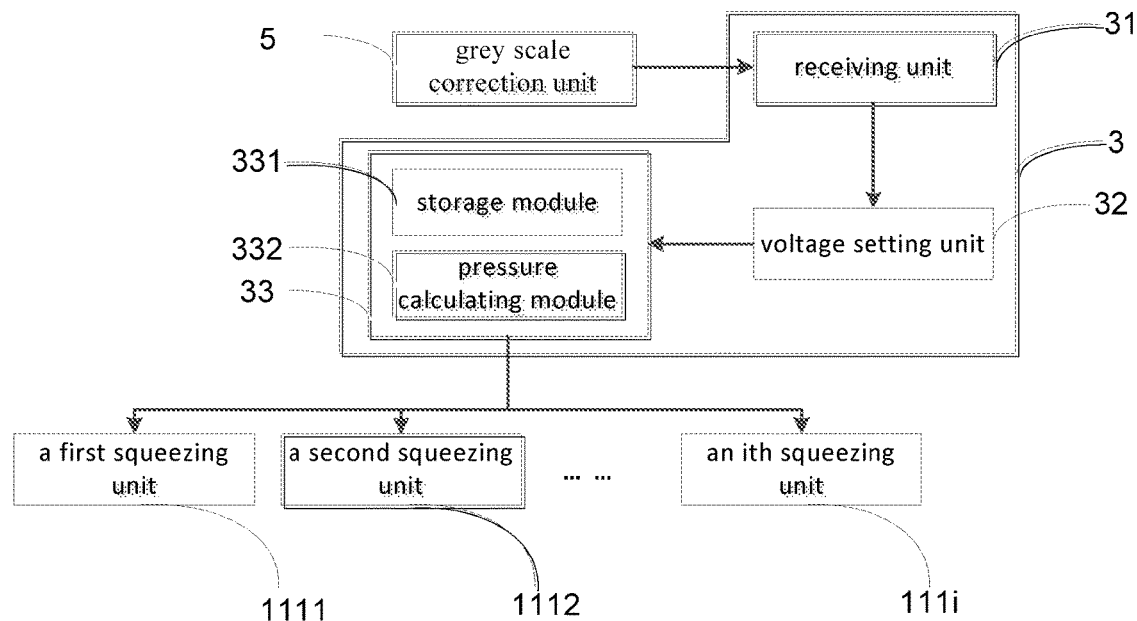
FIG. 7 is a structural block of a pressure control unit provided in an exemplary embodiment.
Figure 10:
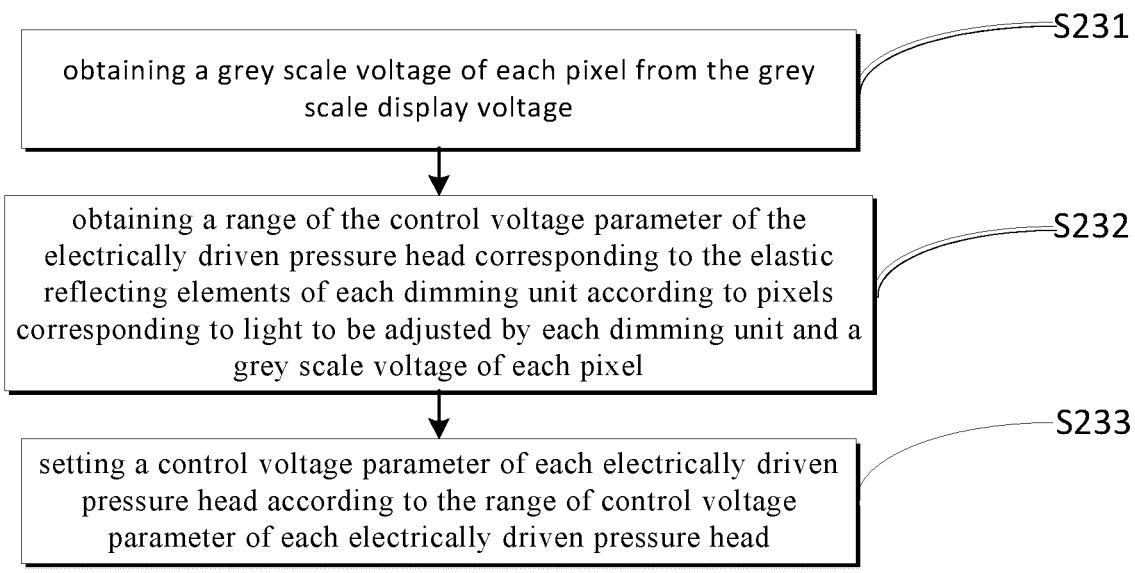
FIG. 10 is a flow chart of setting a control voltage parameter for each squeezing unit in an exemplary embodiment.

Specifically, as shown FIG. 1, FIG. 7 and FIG. 10, a voltage setting unit 32 in an exemplary embodiment obtains a grey scale voltage of each pixel from the grey scale display voltage; obtains a range of a control voltage parameter of an electrically driven pressure head corresponding to elastic reflecting elements 112 of each dimming unit 11 according to pixels corresponding to light to be adjusted by each dimming unit 11 and a grey scale voltage of each pixel; and sets a control voltage parameter of each electrically driven pressure head according to a range of control voltage parameter of each electrically driven pressure head.

Figure 11:
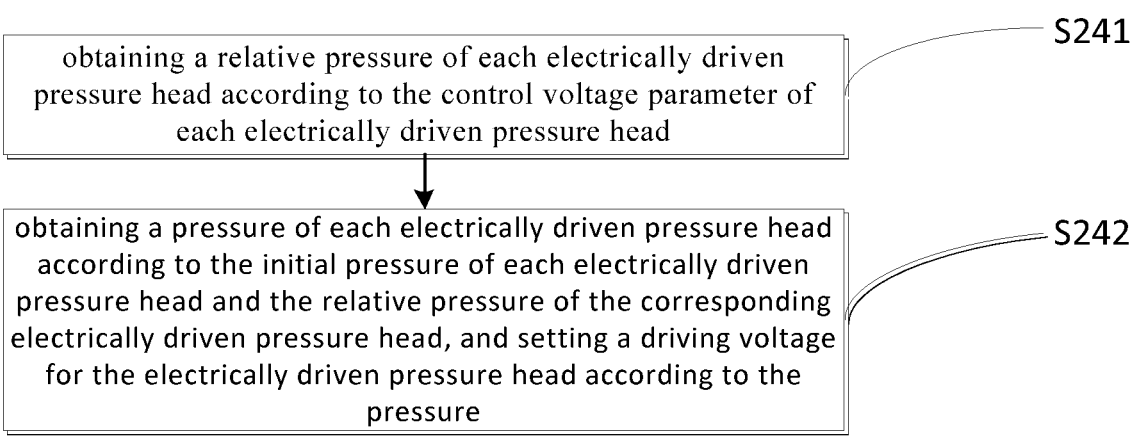
FIG. 11 is a flow chart of setting a control voltage parameter for each squeezing unit in an exemplary embodiment.

As shown FIG. 1, FIG. 7 and FIG. 11, a pressure setting unit 33 in an exemplary embodiment comprises:

a storage module 331 configured to store an initial pressure of each electrically driven pressure head; wherein an initial pressure of each electrically driven pressure head makes brightness of light incident into the transparent substrate 10 homogeneous after being reflected by the elastic reflecting elements 112, wherein an initial pressure of each electrically driven pressure head can be pre-stored in the storage module 331;

a pressure calculating module 332 connected to the voltage setting unit 32 and the storage module 331 and configured to obtain a relative pressure of each electrically driven pressure head according to a control voltage parameter of each electrically driven pressure head and to obtain a pressure of each electrically driven pressure head according to an initial pressure of each electrically driven pressure head and a relative pressure of the corresponding electrically driven pressure head.

From the specific description of the pressure setting unit 33 it can be seen that since a grey scale display voltage is generated after grey scale correction, before grey scale correction, a white balance adjustment needs to be performed, such that the grey scale display voltage is a voltage parameter of a relatively white balance state. Thus, the pressure calculating module 332 obtains a relative pressure of each electrically driven pressure head based on a control voltage parameter of each electrically driven pressure head. Since the storage module 331 stores initial pressure of the electrically driven pressure heads, the initial pressure of the electrically driven pressure heads makes light incident into the transparent substrate 10 exhibit a homogeneous brightness after being reflected by the elastic reflecting elements 112, which is equivalent to a pressure applied by the electrically driven pressure heads to the corresponding elastic reflecting elements 112 in a white balance state. Thus, an actual pressure of each electrically driven pressure head can be obtained based on an initial pressure of each electrically driven pressure head and a relative pressure of the corresponding electrically driven pressure head.

It should be noted that each dimming unit 11 in an embodiment of the present disclosure further comprises an elastic buffering plate 113 disposed on a side of a squeezing plate in proximity to an elastic sphere. A projection area of said elastic buffering plate on said transparent substrate covers a projection area of a squeezing face of said squeezing plate on said transparent substrate, such that buffering can be provided by the elastic buffering plate 113 when the electrically driven pressure head squeezes corresponding elastic reflecting elements 112, thereby avoiding abrasion of the surface of the elastic reflecting elements 112 caused by the electrically driven pressure head when squeezing the elastic reflecting elements 112 directly.

Since any two any two adjacent elastic reflecting elements 112 have a gap under the maximal squeezing state, light may leak from the gap when irradiating onto the elastic reflecting elements 112. To prevent light leakage, said elastic buffering plate 113 has a reflecting function, when the elastic buffering plate 113 forms a reflecting layer relative to the surface of the elastic reflecting elements 112, or the color of the surface can be set as white or silver to enhance the reflecting efficiency. The elastic buffering plate 113 may be made of a rubber material, a polypropylene material or other elastic polymer materials.

An elastic buffering plate 113 in an exemplary embodiment can be a separated type or an integrated type, as long as it can provide certain protection to the elastic reflecting elements 112 while ensuring no light leakage.

When the elastic buffering plate 113 included in the dimming unit 11 in the aforesaid exemplary embodiment has a reflecting function, there is no need to additionally arrange a reflecting plate in the backlight module provided by the exemplary embodiment. In this way, unnecessary waste can be avoided and production cost can be reduced.

Figure 8:
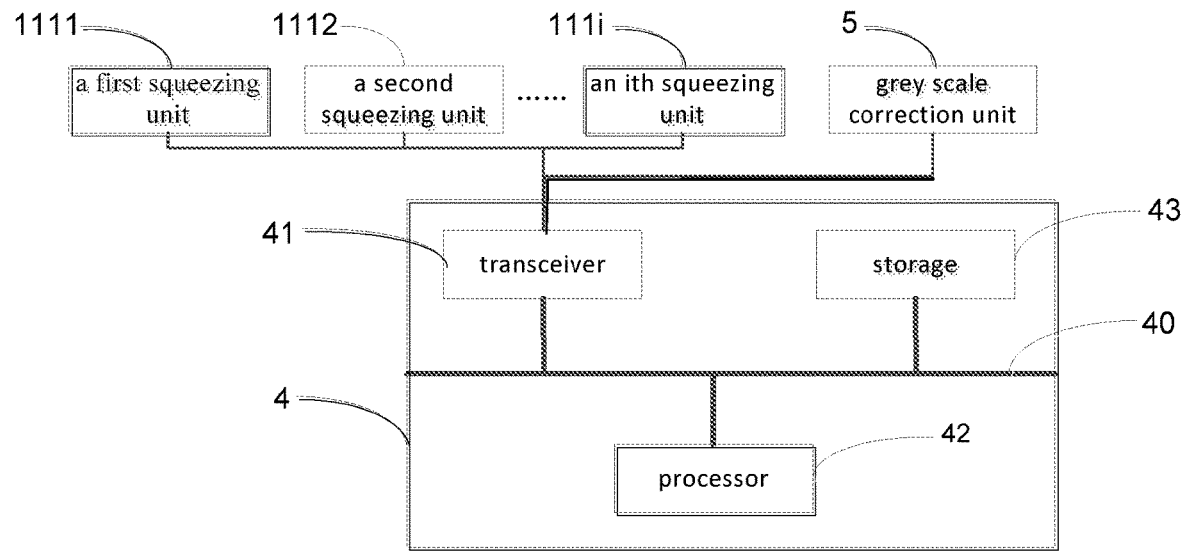
FIG. 8 is a structural block of a pressure control unit provided in an exemplary embodiment.

As shown in FIG. 7, a pressure control unit 3 provided in an exemplary embodiment, after being hardware implemented, can be integrated into a pressure control chip and connected to a grey scale correction unit 5 in a display control circuit. As shown in FIG. 8, a pressure control unit 3 provided in an exemplary embodiment, after being hardware implemented, forms a pressure control terminal 4 as shown in FIG. 8, comprising a transceiver 41, a storage 43 and a processor 42. The transceiver 41, the storage 43 and the processor 42 communicate via a bus 40.

The transceiver 41 supports communication of the processor 42 with the grey scale correction unit 5 and the squeezing units 111 (a number of i squeezing units). The storage 43 stores a plurality of instructions to implement a control method implemented by the pressure control unit 3 in the exemplary embodiment and can store initial pressure of the squeezing units 111. The processor 42 is used to execute the plurality of instructions to implement the control method of the pressure control unit.

The processor 42 provided in an exemplary embodiment can be a processor or a general term of a plurality of processing elements. For example, the processor 42 may be a Central Processing Unit (CPU), or an Application Specific Integrated Circuit (ASIC), or one or more integrated circuit(s) configured as in the embodiments of the present disclosure, e.g. one or more digital signal processor (DSP), or one or more Field Programmable Gate Array (FPGA).

The storage 43 can be a storage device or a general term for a plurality of storage elements used for storing executable program codes, etc. The storage 43 may include a random access memory (RAM), or a non-volatile memory, such as a disk memory or a Flash, etc.

The bus 40 can be an Industry Standard Architecture (ISA) bus, a Peripheral Component Interconnect (PCI) bus or an Extended Industry Standard Architecture (EISA) bus, etc. The bus 40 can be divided into an address bus, a data bus and a control bus, etc. To facilitate illustration, the bus is illustrated with a bold line, but this does not indicate there is only one bus or one type of bus.

Figure 9:
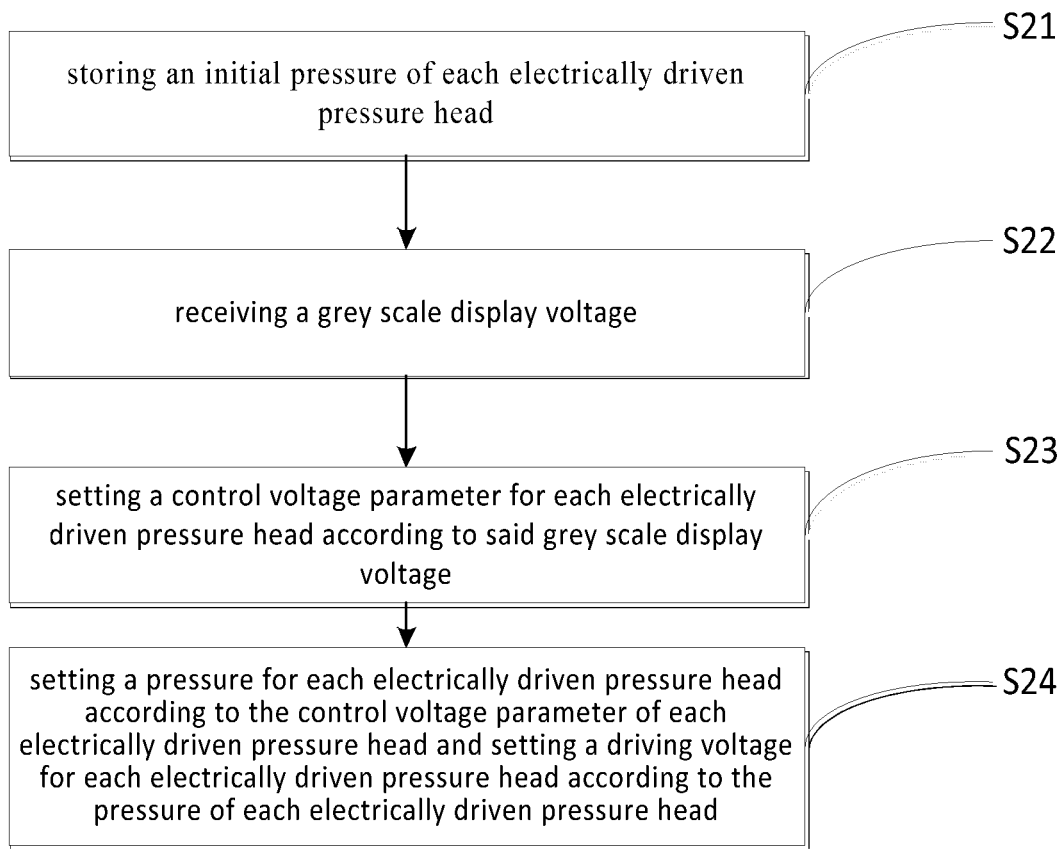
FIG. 9 is a specific flow chart of controlling by a pressure control unit provided in an exemplary embodiment.

An exemplary embodiment further provides a method for controlling a backlight module, used to control a backlight module provided in the aforesaid embodiments, as shown in FIG. 1, FIG. 7 and FIG. 9, the method for controlling a backlight module comprises:

a pressure controlling unit controlling a pressure of each electrically driven pressure head according to a dimming requirement of an image, such that light incident into the transparent substrate 10 is reflected by the respective elastic reflecting elements 112 and exits from a surface of the transparent substrate 10 facing away from the plurality of elastic reflecting elements 112.

As compared with related art, the method for controlling a backlight module provided in an exemplary embodiment can obtain the same beneficial effects as the backlight module provided in the above technical solutions and are not repeated herein.

Specifically, as shown in FIG. 9, controlling a pressure of each electrically driven pressure head according to a dimming requirement of an image comprises:

Step S22: receiving a grey scale display voltage;

Step S23: setting a control voltage parameter for each electrically driven pressure head according to said grey scale display voltage;

Step S24: setting a pressure for each electrically driven pressure head according to the control voltage parameter of each electrically driven pressure head and setting a driving voltage for each electrically driven pressure head according to the pressure of each electrically driven pressure head.

As shown in FIGS. 1-4 and FIG. 10, setting a control voltage parameter for each electrically driven pressure head according to said grey scale display voltage in an exemplary embodiment comprises:

Step S231: obtaining a grey scale voltage of each pixel from the grey scale display voltage;

Step S232: obtaining a range of a control voltage parameter of an electrically driven pressure head corresponding to the elastic reflecting elements 112 of each dimming unit 11 according to pixels corresponding to light to be adjusted by each dimming unit 11 and a grey scale voltage of each pixel;

Step S233: setting a control voltage parameter of each electrically driven pressure head according to a range of control voltage parameter of each electrically driven pressure head.

Illustratively, assuming that the current dimming unit 11 corresponds to three pixels, then a range of the control voltage parameter of the electrically driven pressure head corresponding to the elastic reflecting elements 112 of the current dimming unit 11 is a range between a maximum value of the grey scale voltage and a minimum value of the grey scale voltage of the three pixels. The control voltage parameter of the electrically driven pressure head corresponding to the elastic reflecting elements 112 of the current dimming unit 11 only needs to be between the maximum value and the minimum value of the grey scale voltage of the three pixels corresponding to the current dimming unit 11. For example, an average value of a sum of the grey scale voltages of the three pixels corresponding to the current dimming unit 11 can be selected as a control voltage parameter of the electrically driven pressure head corresponding to the elastic reflecting elements 112 of the current dimming unit 11.

As shown in FIG. 1 and FIG. 9, prior to receiving a grey scale display voltage, the method for controlling a backlight module provided in an embodiment of the present disclosure further comprises:

Step S21: storing an initial pressure of each electrically driven pressure head; wherein an initial pressure of each electrically driven pressure head makes the brightness of light incident into the transparent substrate homogeneous after being reflected by the elastic reflecting elements;

As shown in FIG. 1 and FIG. 11, setting a pressure for each electrically driven pressure head according to the control voltage parameter of each electrically driven pressure head comprises:

Step S241: obtaining a relative pressure of each electrically driven pressure head according to the control voltage parameter of each electrically driven pressure head; wherein the relative pressure can be either a positive value or a negative value, specifically determined by a magnitude of the grey scale voltage, the smaller the grey scale voltage is, the smaller the relative pressure is; the greater the grey scale voltage is, the greater the relative pressure is.

Step S242: obtaining a pressure of each electrically driven pressure head according to the initial pressure of each electrically driven pressure head and the relative pressure of the corresponding electrically driven pressure head, and setting a driving voltage for the electrically driven pressure head according to the pressure; wherein the pressure of each electrically driven pressure head is equal to a sum of the initial pressure of the electrically driven pressure head and the relative pressure of the corresponding electrically driven pressure head.

An exemplary embodiment further provides a display screen, comprising said backlight module and a display panel for use in collaboration with said backlight module, wherein said display panel is disposed on a light exiting face of said backlight module. Specifically the display panel is disposed on a surface of the transparent substrate 10 facing away from the dimming unit 11.

In a display screen provided in an exemplary embodiment, each dimming unit is used to adjust brightness of at least one pixel of said display panel for use in collaboration with said backlight module. Each dimming unit comprises a squeezing unit and at least one elastic reflecting element located between said squeezing unit and a surface of said transparent substrate; and wherein said squeezing unit applies a pressure towards said elastic reflecting element, wherein said elastic reflecting element has an elastic deformation when a pressure is applied by said squeezing unit and changes a contact area with said transparent substrate.

In the display screen provided in an exemplary embodiment, a coverage area of each elastic reflecting element on said transparent substrate does not exceed a total area of 150 pixels of the display panel.

As compared with related art, the display screen provided in an embodiment of the present disclosure can obtain the same beneficial effects as the backlight module provided in the above technical solutions and are not repeated herein.

An exemplary embodiment further provides a wearable device including a display screen provided in the aforesaid embodiment.

As compared with related art, the wearable device provided in the exemplary embodiment can obtain the same beneficial effects as the backlight module provided in the above technical solutions and are not repeated herein.

Wherein the wearable device provided in the exemplary embodiment can be an AR wear device, or a VR wear display device, or any other wear devices having a display function.

In the description of the aforesaid implementing modes, the specific features, structures, materials or characteristics can be combined in a suitable manner in any one or more embodiments or examples.

The above depictions are only specific implementing nodes of the present disclosure, but the scope of protection of the present disclosure is not limited thereto. Any modification or substitution that can be easily conceived by any skilled person in the art within the technical scope revealed herein should fall within the scope of protection of the present disclosure. Therefore, the scope of protection of the present disclosure should be determined by the scope of protection of the claims.

The invention claimed is:

1. A backlight module, comprising a light source and a light guide plate, wherein said light guide plate comprises a transparent substrate and a plurality of dimming units having a reflecting function, said light source is disposed on at least one side of said transparent substrate, and said plurality of dimming units is disposed on a lower surface of the transparent substrate and adjusts intensity of light incident from said light source into said light guide plate and emergent from an upper surface of said transparent substrate facing away from said dimming units, wherein at least one of the dimming units comprises a squeezing unit and at least one elastic reflecting element located between said squeezing unit and a surface of said transparent substrate; said squeezing unit is configured to provide a pressure towards said elastic reflecting element, said elastic reflecting element is configured to produce an elastic deformation when the pressure is provided by said squeezing unit and change a contact area with said transparent substrate, and wherein said elastic reflecting element is an elastic sphere having a reflecting surface, and two adjacent elastic reflecting elements have a space therebetween.

2. The backlight module according to claim 1, wherein the dimming units are distributed in a matrix on said transparent substrate.

3. The backlight module according to claim 1, wherein said squeezing unit comprises a squeezing plate in contact with said at least one elastic reflecting element and an electrically driven pressure head connected to said squeezing plate, wherein said electrically driven pressure head is configured to drive said squeezing plate to squeeze said elastic reflecting element.

4. The backlight module according to claim 3, wherein said backlight module further comprises a pressure control unit connected to each electrically driven pressure head;

wherein said pressure control unit is configured to control a pressure of each electrically driven pressure head based on a dimming requirement.

5. The backlight module according to claim 4, wherein said pressure control unit comprises:

a receiving unit connected to a grey scale correction unit and configured to receive a grey scale display voltage;

a voltage setting unit configured to set a control voltage parameter for each electrically driven pressure head according to said grey scale display voltage;

a pressure setting unit configured to set a pressure for each electrically driven pressure head according to the control voltage parameter for each electrically driven pressure head and to set a driving voltage for each electrically driven pressure head according to the pressure of each electrically driven pressure head.

6. The backlight module according to claim 5, wherein said pressure setting unit comprises:

a storage module configured to store an initial pressure of each electrically driven pressure head; wherein the initial pressure of each electrically driven pressure head makes brightness of light incident into the transparent substrate homogeneous after being reflected by the elastic reflecting elements;

a pressure calculating module configured to obtain a relative pressure of each electrically driven pressure head according to a control voltage parameter of each electrically driven pressure head and to obtain a pressure of each electrically driven pressure head according to an initial pressure of each electrically driven pressure head and a relative pressure of the corresponding electrically driven pressure head.

7. The backlight module according to claim 3, further comprising an elastic buffering plate disposed on a side of said squeezing plate in proximity to said elastic reflecting element, wherein a projection area of said elastic buffering plate on said transparent substrate covers a projection area of a squeezing face of said squeezing plate on said transparent substrate, and said elastic buffering plate has a reflecting function.

8. A display screen, comprising the backlight module according to claim 1 and a display panel for use in collaboration with said backlight module, wherein said display panel is disposed on a light exiting face of said backlight module.

9. The display screen according to claim 8, wherein at least one of the dimming units is configured to adjust brightness of at least one pixel of said display panel for use in collaboration with said backlight module.

10. The display screen according to claim 8, wherein at least one of the dimming units comprises a squeezing unit and at least one elastic reflecting element located between said squeezing unit and a surface of said transparent substrate; said squeezing unit is configured to provide a pressure towards said elastic reflecting element, said elastic reflecting element is configured to produce an elastic deformation when the pressure is provided by said squeezing unit and change a contact area with said transparent substrate.

11. The display screen according to claim 10, wherein a coverage area of each elastic reflecting element on said transparent substrate is in a range of a total area of 150 pixels of the display panel.

12. A wear device, comprising the display screen according to claim 8.

13. A method for controlling a backlight module according to claim 4, comprises:

receiving a grey scale display voltage;

setting a control voltage parameter for each electrically driven pressure head according to said grey scale display voltage;

setting a pressure for each electrically driven pressure head according to the control voltage parameter for each electrically driven pressure head and setting a driving voltage for each electrically driven pressure head according to the pressure of each electrically driven pressure head.

14. The method for controlling a backlight module according to claim 13, wherein, prior to receiving a grey scale display voltage, said method for controlling a backlight module further comprises:

storing an initial pressure of each electrically driven pressure head, wherein the initial pressure of each electrically driven pressure head controls brightness of light incident into the transparent substrate to be homogeneous after being reflected by the elastic reflecting elements;

wherein setting a pressure for each electrically driven pressure head according to the control voltage parameter for each electrically driven pressure head comprises:

obtaining a relative pressure of each electrically driven pressure head according to the control voltage parameter of each electrically driven pressure head;

obtaining a pressure of each electrically driven pressure head according to the initial pressure of each electrically driven pressure head and the relative pressure of the corresponding electrically driven pressure head.

15. The backlight module according to claim 4, further comprising an elastic buffering plate disposed on a side of said squeezing plate in proximity to said elastic reflecting element, wherein a projection area of said elastic buffering plate on said transparent substrate covers a projection area of a squeezing face of said squeezing plate on said transparent substrate, and said elastic buffering plate has a reflecting function.

16. The backlight module according to claim 5, further comprising an elastic buffering plate disposed on a side of said squeezing plate in proximity to said elastic reflecting element, wherein a projection area of said elastic buffering plate on said transparent substrate covers a projection area of a squeezing face of said squeezing plate on said transparent substrate, and said elastic buffering plate has a reflecting function.

17. The backlight module according to claim 6, further comprising an elastic buffering plate disposed on a side of said squeezing plate in proximity to said elastic reflecting element, wherein a projection area of said elastic buffering plate on said transparent substrate covers a projection area of a squeezing face of said squeezing plate on said transparent substrate, and said elastic buffering plate has a reflecting function.

* * * * *